(12) United States Patent
Hinton et al.

(10) Patent No.: US 7,478,434 B1
(45) Date of Patent: Jan. 13, 2009

(54) AUTHENTICATION AND AUTHORIZATION PROTOCOL FOR SECURE WEB-BASED ACCESS TO A PROTECTED RESOURCE

(75) Inventors: Heather Maria Hinton, Austin, TX (US); Mark Vandenwauver, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1456 days.

(21) Appl. No.: 09/583,406

(22) Filed: May 31, 2000

(51) Int. Cl.
*G06F 17/30* (2006.01)
(52) U.S. Cl. .............................. 726/27; 726/28; 726/29; 726/30
(58) Field of Classification Search ................. 713/200, 713/153, 170, 169, 172, 178–181, 185, 201, 713/193; 709/229; 726/27–30; 380/46
See application file for complete search history.

(56) References Cited

U.S. PATENT DOCUMENTS

| | | | |
|---|---|---|---|
| 5,535,276 A | | 7/1996 | Ganesan |
| 5,715,314 A | * | 2/1998 | Payne et al. .................... 705/78 |
| 5,864,665 A | | 1/1999 | Tran |
| 5,875,296 A | | 2/1999 | Shi et al. |
| 5,884,024 A | | 3/1999 | Lim et al. |
| 5,907,621 A | * | 5/1999 | Bachman et al. ............. 713/155 |
| 5,908,469 A | | 6/1999 | Botz et al. |
| 5,963,915 A | | 10/1999 | Kirsch |
| 6,064,736 A | * | 5/2000 | Davis et al. .................. 713/155 |
| 6,360,254 B1 | * | 3/2002 | Linden et al. ................ 709/219 |
| 6,374,359 B1 | * | 4/2002 | Shrader et al. ............... 713/201 |
| 6,446,052 B1 | * | 9/2002 | Juels ............................ 705/69 |
| 6,510,464 B1 | * | 1/2003 | Grantges, Jr. et al. ....... 709/225 |
| 2002/0178370 A1 | * | 11/2002 | Gurevich et al. ............ 713/189 |

FOREIGN PATENT DOCUMENTS

| | | |
|---|---|---|
| JP | 11-98134 | 3/1999 |
| WO | 99/00960 | 1/1999 |

OTHER PUBLICATIONS

RD Jun. 1998 n410116 p. 800: "Internet based secure transactions using encrypting applets and cgi-scripts independent of browser or server capabilities".
11-098134, Apr. 9, 1999- Method For Detecting Fraudulent Alteration and Copy of "Cookie" and program storage medium.
IEEE No. 96CB35924: Limitations on design principles for public key protocols, May 1996.
IEEE No. 96CB35924:Limitations on design principles for public key protocols May 1996.

* cited by examiner

*Primary Examiner*—Hosuk Song
(74) *Attorney, Agent, or Firm*—Jeffrey S. LaBaw

(57) ABSTRACT

When a user makes a request to access a protected resource identified by a URL, client-side code in a web browser is used to generate an authentication token, which is then sent to the server along with an identity cookie that was set by that server. The authenticated token is then used by the server to authenticate that the request is properly tied to a given identity contained in the identity cookie. If the authentication token can be validated at the server, an access control decision is then executed to determine whether to invoke the request for the protected resource. If the authentication token cannot be validated, an access denied request is returned to the requesting client.

35 Claims, 4 Drawing Sheets

AUTHENTICATION AND AUTHORIZATION PROTOCOL FOR SECURE WEB-BASED ACCESS TO A PROTECTED RESOURCE

BACKGROUND OF THE INVENTION

1. Technical Field

The present invention relates generally to techniques for enabling users on the Internet to securely access resources in various locations. More specifically, the invention relates to a web-based access control technique that uses a per-request client-generated token to authenticate that a request for access to a protected resource is properly bound with a given user identity.

2. Description of the Related Art

Information technology (IT) systems and the Internet have fueled the growth of the current global economy. While IT systems have significant benefits, at the same time they pose potential security threats from unauthorized third parties. Indeed, the lack of security in modern IT systems has emerged as a threat to the integrity of global computer networks. To deal with this problem, IT systems provide a number of known services: data authentication, data confidentiality, entity authentication, and authorization, among others. Data authentication typically consists of two sub-services, data integrity and data origin authentication. A data integrity service is used to convince a receiver of given data that the data was not changed during transit. Data origin authentication proves to the receiver the identity of the real sender. Data confidentiality protects against disclosure of data during transmission. Entity authentication provides the system with proof that a certain entity is who they claim to be. Authorization is the act of determining whether an authenticated entity has the right to execute an action. Authorization and authentication thus are dual services. To be able to provide authorization, it is necessary to determine who the entity is (e.g., by entity authentication). Authorization, in general, consists of two separate stages: providing privileges (authorization credentials) to a particular entity, and using these privileges in combination with access decision rules at the resource to determine if access should be granted to the entity.

It is becoming increasingly important to allow users to securely access resources in various locations. For example, an employee of a company may need to access documents from a main office and also from a local office while located at home or at a customer's premises. A browser has become the tool of choice in such scenarios. Through the standard Hypertext Transfer Protocol (HTTP), the browser can be used to access any HTTP-enabled server (commonly called a Web Application Server (WAS)) and obtain access to the resource. Most browsers provide security through the Transport Layer Security (TLS) protocol. This protocol allows both the browser and the WAS to authenticate each other (i.e. to prove their identity to each other), and it also provides data protection (data integrity and data confidentiality) for data in transit between them. The strongest form of authentication provided by the TLS/SSL protocol is client- and server-side certificate authentication. Such authentication requires the client (the browser) and the server (the WAS) to each have a private/public cryptographic key pair, and associated certificates. Public key authentication maintains a binding between a user's identity and a public key that can only be unlocked by the associated private key, and these protocols are used to provide mutual authentication.

If the user at the client desires to access a URL on the server that can only be accessed by an authenticated and authorized user, however, there must be some process to determine authorization. SSL does not provide authorization (or other security services) to the Web Application Server. Therefore, although the server can be sure of the user's identity via authentication, it does not know the user's privileges.

One attempt to solve the authorization problem is to pass authentication information within a cookie. As is well-known, a cookie is a file that is set by a server to customize data to a particular user's web browser. Cookies thus provide a degree of "state" to HTTP, which is otherwise a stateless protocol. When a user of a client machine visits a web server, the server may return a cookie to the user's browser. When a cookie is set as part of a HTTP transaction, it may include the path the cookie is valid for, the cookie's name and value, and other optional attributes, such as the cookie's expiration date. By default, the browser automatically stores the cookie data, typically without giving the user the option or knowledge of it being done. Because the cookie is stored, it is often referred to as "persistent." Later, when the user revisits the server, the cookie is sent with the request, thereby identifying the user to the server.

Thus, the typical persistent cookie set on a client's browser identifies the user to the server. In prior art solutions, such as those provided commercially by enCommerce GetAccess™ and Netegrity SiteMinder™, authentication data is forwarded within a persistent cookie when the client browser issues a request for a protected resource to the server that set that cookie. Such an approach, however, is insecure because it enables an attacker to equate possession of the cookie with the user's authorization (i.e. a proof of identity) to access the protected resource. As a consequence, these prior art schemes are highly susceptible to replay attacks wherein one who acquires the identity cookie can simply assert it to gain access to the protected resource.

The present invention addresses this problem.

BRIEF SUMMARY OF THE INVENTION

To ensure that a request for a protected resource is both authenticated and authorized, the present invention contemplates the client-side generation of a one-time only use authentication token that travels along with and protects an identity cookie that is forwarded to the server with the request. An authentication token of this type is used to validate the particular request to access a protected resource and to ensure that the user making the request, insofar as possible, is authorized. Preferably, the token is unique to a given request and unforgeable. It may include a time value that is used to protect against replay attacks that might otherwise occur due to network latencies. In an illustrative embodiment, the authentication token is protected by a key shared between the client and the server. Knowledge of this key implies authenticity of the client; thus, the key should be stored in a secure manner at the client. Preferably, the key resides in system memory only and is regenerated whenever a new identity cookie is produced.

When a user makes a request to access a protected resource identified by a URL, client-side code is used to generate the authentication token, which is then sent to the server along with an identity cookie that was set by that server. In particular, the authentication token may be placed within the HTTP header and is forwarded to the server together with the identity cookie. The authenticated token is then used by the server to authenticate that the request is properly tied to a given identity contained in the identity cookie. If the authentication token can be validated at the server, an access control decision is then executed to determine whether to invoke the request for the protected resource. If the authentication token cannot be validated, an access denied request is returned to the requesting client.

The foregoing has outlined some of the more pertinent objects and features of the present invention. These objects should be construed to be merely illustrative of some of the more prominent features and applications of the invention. Many other beneficial results can be obtained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
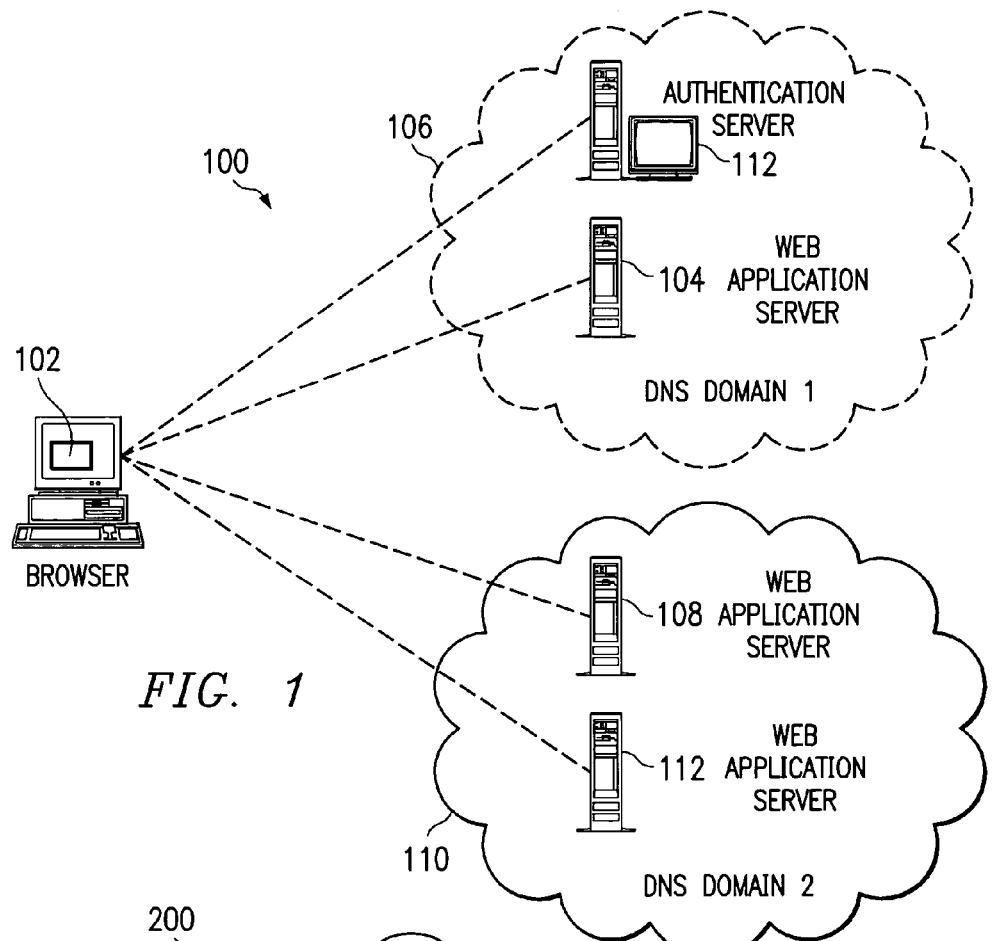
FIG. 1 illustrates a web-based environment in which the present invention may be implemented.

FIG. 1 illustrates a web-based environment in which the present invention may be implemented. In this environment, a user of a browser 102 at client 100 desires to access a protected resource on web application server 104 in DNS domain 106, or on web application server 108 in DNS domain 110. A protected resource is a resource (an object, a document, a page, or the like) that is only retrieved if the requesting client browser is both authenticated and authorized. Each DNS domain may have an associated authentication server 112. Typically, once the user is authenticated by the authentication server, a cookie may be set and stored in a cookie cache in the browser. The requesting client may make an intra-domain request or an inter-domain request for the protected resource. An intra-domain request means that the target resource is located on the same server that performs the authentication. An inter-domain request means that the target resource is located within the same Internet domain but is on a different server than the authentication server which established the authentication. A cross-domain request means that the user wishes to access a protected resource that is outside its DNS domain.

Figure 2:
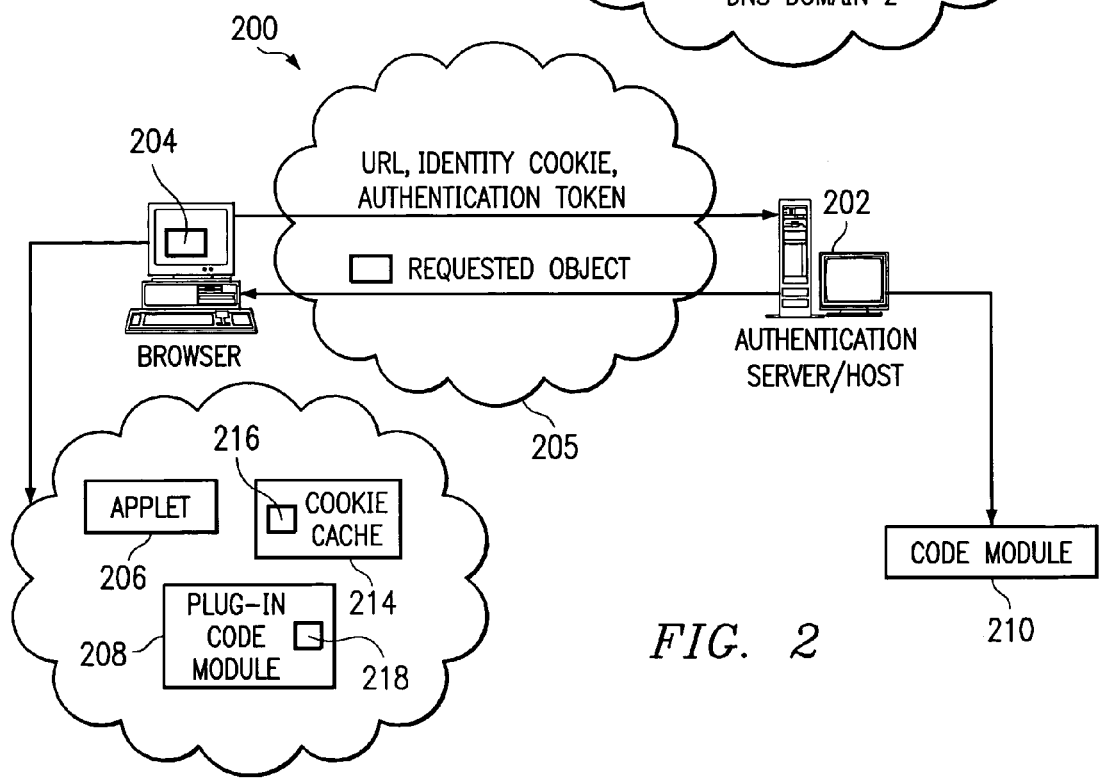
FIG. 2 is a simplified illustration of how a requesting client communicates with a server to obtain access to a protected resource on or associated with the server according to the present invention.

FIG. 2 illustrates how a requesting client may be used to request the protected resource according to the present invention. As illustrated, the user at a client workstation 200 seeks access over computer network 205 to a protected resource on a server 202 through the user's web browser 204. As noted above, a protected resource is identified by a URL that can only be accessed by an authenticated and authorized user. The computer network 205 may be the Internet, an intranet, or other network. Server may be a Web Application Server (WAS), a server application, a servlet process or the like. According to the invention, the client 200 receives an applet or equivalent code 206 from the server 202. Applet 206 installs a plug-in or equivalent code module 208 that performs the client-side piece of the inventive functionality. The server-side piece of the functionality is provided by code module 210 that is resident in or accessible to the server. If the plug-in module 208 has been installed previously, the module is triggered by the server sending the client a custom MIME/type. The applet 206 preferably is signed so that it can get out of the Java sandbox. In this scenario, it is assumed that the user has been allocated a password in a secure way (preferably out-of-band), that this password is stored at the server side in a secure way, that the applet 206 is signed with a key corresponding to a trusted certificate, that the browser 204 has been configured to execute signed applets from a trusted source, and that the server 202 needs to keep track of the state of the system.

In a preferred embodiment, the applet is written in Java, although this is not a requirement. The plug-in may also be written in Java, but it is preferably native code. Because an embedded applet stops working when the user switches to another web page, the applet cannot be used effectively to manage and perform cryptographic operations on the client. Therefore, preferably the signed Java applet is sent merely to install the plug-in.

As also seen in FIG. 2, client browser 204 has a cookie cache 214 in which an identity cookie 216 is stored. As is well-known, whenever the browser makes a request for a given URL at a server, the contents of the cookie cache are forwarded to the server. According to the present invention, a given URL request for a protected resource also includes another piece of data 218, referred to as an authentication token, which can be used at the server to authenticate whether the request is tied to a given identity in the identity cookie. If so, the server may initiate or invoke an access control decision (ACD) to determine whether to afford access to the protected resource. Preferably, the authentication token is a one-time only use token that is also time-dependent. The authentication token is generated by the browser plug-in or equivalent code and is preferably stored is system memory, not the cookie cache or other storage. Thus, the authentication token may be thought of as a non-persistent, unforgeable piece of data that facilitates authorization of the requestor when a given client request for a protected request is sent to a server. The token validates the identity cookie previously set by the server, as will be seen.

By way of brief background, the following notation is used to describe cryptographic operations in the present invention. MAC(K)(m) refers to a Message Authentication Code calculated on a message m with a symmetric key K. S refers to a web server; C refers to a web client browser. $K_{CS}$ is a long-term symmetric key shared between the client and the server. The term $k_C$ refers to a short term symmetric key used to authenticate the client. The term $k_{SC}$ refers to a short term symmetric key used to authenticate a request to access a protected resource at server S and to bind this request to client C. T refers to a timestamp, and N refers to a nonce (a non-repeating number) where $N_S$ is a nonce generated by server S.

As will be seen, a user that issues a request to access a protected resource provides an identity cookie, which is a persistent cookie, that must first be provided or "set" by a given authentication server. The authentication server may or may not be the server that otherwise hosts the protected resource. In certain circumstances, however, a client may not possess such a cookie. One reason is that the client does not have the required plug-in that provides the inventive functionality; another reason is that the user has purged his or her cookie cache, where the persistent identity cookie is normally stored. Thus, by way of background, it may be necessary for the requesting client to obtain an authentication server-issued identity cookie as now described.

Figure 3:
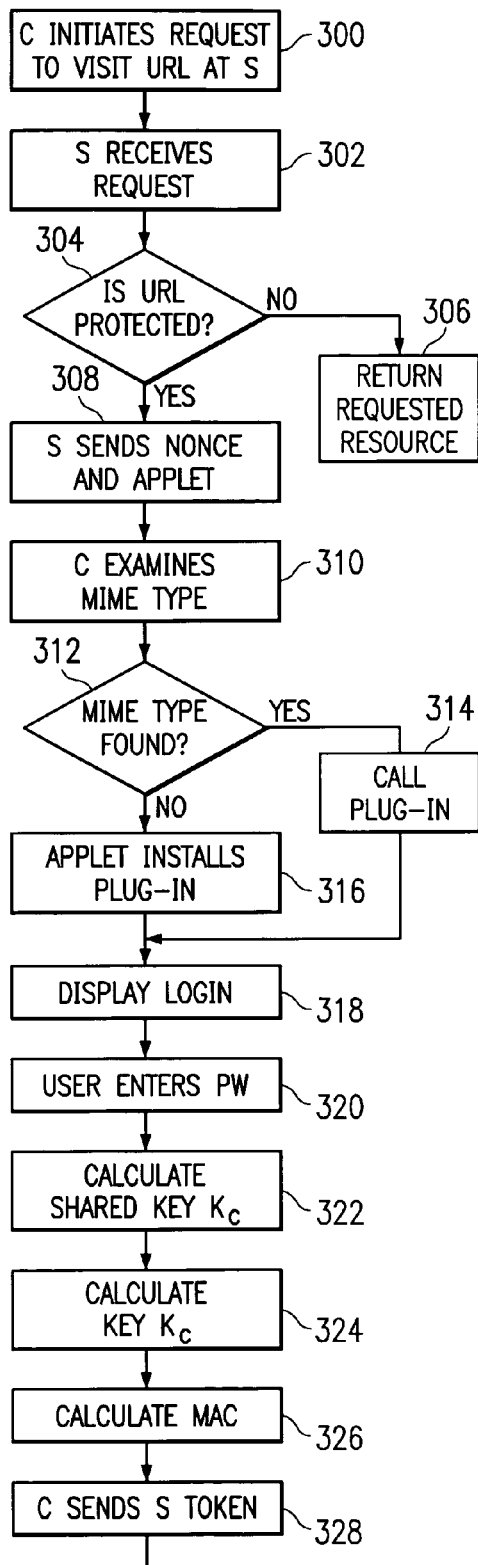
FIG. 3 is a flowchart illustrating how a user obtains a authentication server-issued identity cookie for use in the authentication and authorization protocol of the present invention.
Figure 3:
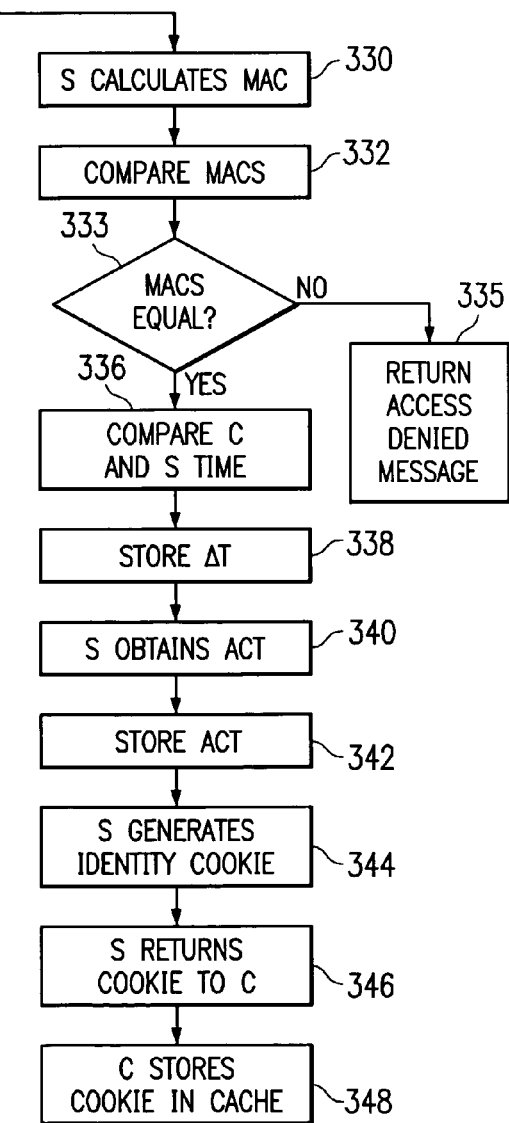

In particular, FIG. 3 is a flowchart illustrating how a user obtains an identity cookie and the component elements thereof according to the preferred embodiment of the invention. As will be seen, some of these steps occur on the client (through operation of the plug-in), while some of the steps occur on the server. The routine begins at step 300 with the client C initiating a request to visit a URL at server S. In this scenario, it is assumed that this request does not include an identity cookie. At step 302, the server S receives the HTTP request. A test is then performed at step 304 to determine whether the URL can only be accessed by an authenticated and authorized user. If the URL is available without restriction, the corresponding object, document or page is returned at step 306. If, however, the URL can only be accessed by an authenticated and authorized user, the routine continues at step 308. At this step, the server sends the client a nonce (a non-repeating number) $N_S$ and the signed applet that will be used on the client to install and activate the required client-side code, namely, the plug-in. The routine then continues at step 310 with the client examining the MIME-type that corresponds to the plug-in. A test is then performed at step 312 to determine if the MIME-type is found. If so, the routine branches to step 314 and calls the plug-in. If, however, the MIME-type is not found, the routine continues at step 316 with the applet installing and activating the plug-in.

At step 318, which is also reached following step 314, the plug-in puts up a login window at the client. The user then enters his or her username and password at step 320. Using this information, the plug-in then performs a number of calculations as follows. At step 322, the plug-in calculates the long term shared key $K_{CS}$, by applying a one-way function $h^{(1)}$ to the user's password: $K_{CS}=h^{(1)}(PW_C)$. Then, at step 324, the plug-in calculates the key through which the client authenticates to the server: $k_C=h^{(2)}(K_C, N_S, S)$. At step 326, the plug-in calculates a Message Authentication Code (MAC) on the nonce $N_S$, the identity of the server S that generated the nonce, a time $T_0$, and the client's User-ID at S, $UID_{CS}$, as follows: $MAC(k_C)(N_S, S, T_0, UID_{CS})$. The client sends information about its time because there might be a clock skew in the system, i.e. a difference between the clock running at the client and the clock running at the server. At step 328, the client sends to the server the following token to enable the server to authenticate the client:

$$\{N_S, S, T_0, UID_{CS}, MAC(k_C)(N_S, S, T_0, UID_{CS})\}.$$

The routine then continues with the server S attempting to validate the token. At step 329, the server calculates the symmetric session key, $k_C$, based on the user's password (stored at S), following the same steps as described above for the user's generation of $k_C$. At step 330, the server calculates the MAC itself. At step 332, the server compares the MAC to the one it received in the token. A test is then performed at step 333 to determine if the MACs are equal. If not, the routine branches to step 335 to return an access denied message to the client.

This ends the protocol. If, however, the MACs are equal, the server is convinced that the client is authentic. The routine then continues at step 336 to compare the client's time to the server's time. At step 338, the time difference (delta T or clock "skew") is stored in a data structure (representing the client's state) together with the client's authenticating key $k_C$.

The routine then continues at step 340 with the server obtaining an access control token (ACT) (sometimes known as an attribute certificate) for the client. In particular, the server may generate an ACT based on the client's $UID_{CS}$ or it will call an external service (e.g., Policy Director) to provide one (e.g., a Policy Director EPAC). At step 342, the ACT is stored at the server in the client's state data structure and is used by the server S to make access control decisions on requests by the client C. At step 344, the server then generates the client's identity cookie for client C at server S. Preferably, the client's identity cookie contains the client's identifying information at S (e.g., $UID_{CS}$, which could be the user's DCE principal name), and a $URL_{CS}$ that points to where other servers in the system can obtain up-to-date verification of a client's authenticator cookie (as will be described below). The identity cookie should be protected against tampering (thus providing data authentication), for example, using a MAC or a digital signature. The identity cookie is a persistent cookie. A preferred format of the identity cookie is as follows, although any convenient structure may be used:

$$IDC_{CS}=[UID_{CS}, S, URL_{CS}]$$

The inclusion of the access control token in the identity token is optional:

$$IDC_{CS}=[UID_{CS}, S, URL_{CS}],(ACT_{CS}).$$

If it is included, it must be protected from theft, disclosure and modification. The server identification, S, is included in the identity cookie following the practice given in M. Abadi and R. Needham, "Prudent Engineering Practice for Cryptographic Protocols", DEC SRC Research Report 125, June 1994.

At step 346, the identity cookie is returned from the server to the client. The client's browser then stores the identity cookie in the client's cookie cache at step 348 to complete the process.

The above-described scenario for generating a persistent identity cookie may be used if the client already has the plug-in but has purged the cookie cache, the client has an inactive plug-in, or the client simply instigates a login. As can be seen, the identity cookie has additional data (besides the usual data, such as the path the cookie is valid for, the cookie's name and value, and other attributes, such as the cookie's expiration date) that will be used by the inventive protocol when the actual URL request is processed by the browser to attempt to fetch the desired resource.

Figure 4:
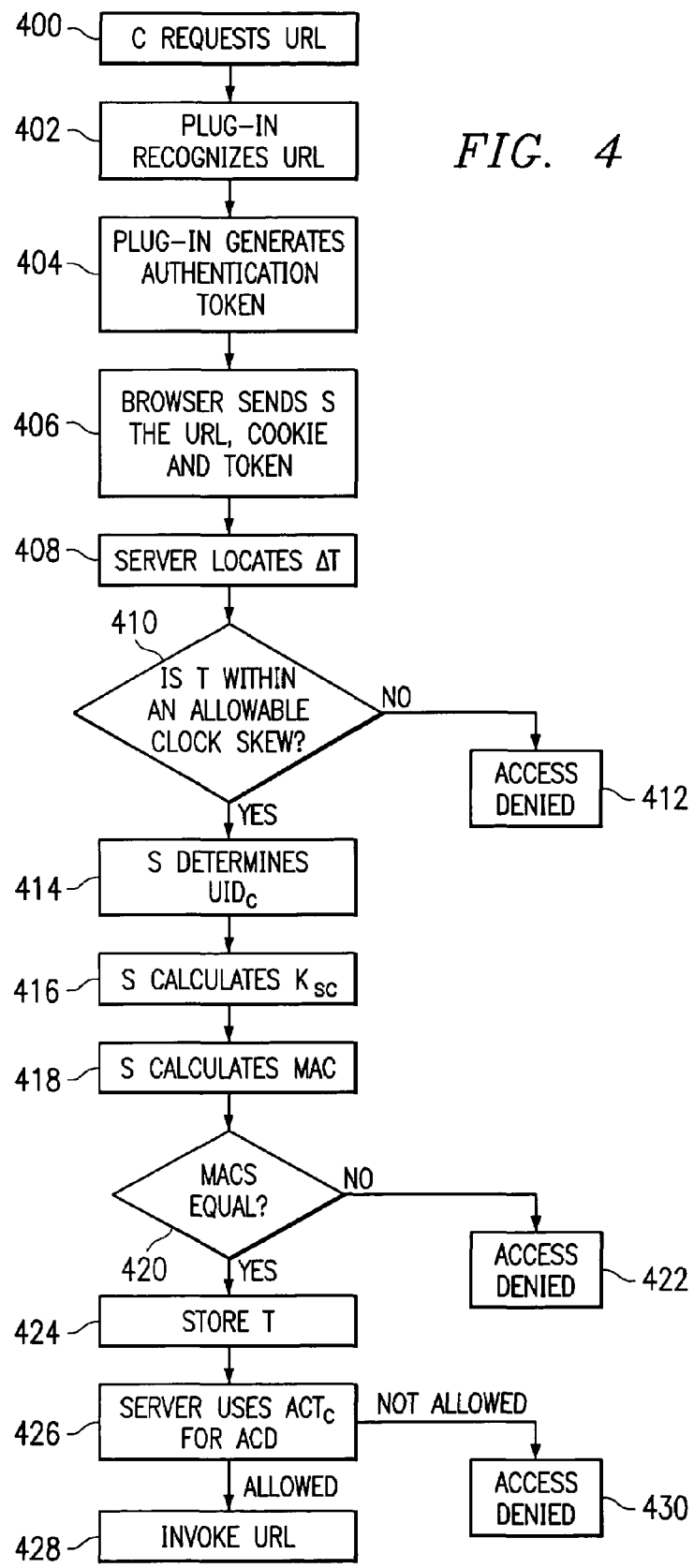
FIG. 4 is a flowchart illustrating the inventive protocol for enabling a user to obtain access to a protected resource using an authentication token that secures identity information in the identity cookie.

In particular, the above-described protocol simply enables the user to obtain an identity cookie that may be used to facilitate the access request. FIG. 4 illustrates a protocol for carrying out an in-domain access request to the protected resource according to the present invention. As noted above, a technical advantage of the present invention is the client-side generation of an authentication token that is passed to the server along with the identity cookie to enable the server to authenticate that the request for access is tied to the identity contained in the identity cookie and to the requested resource. Only if the authentication token is valid does the server then allow the access control decision to proceed. The particular access control function (ACF) that is used to render the access control decision is not part of the present invention; any convenient ACF may be use.

The routine begins at step 400 with the client requesting a URL. At step 402, client-side code in the plug-in recognizes that this URL is located in a domain within the secure environment. At step 404, the plug-in generates the authentication token preferably as follows:

$$ANC_C = \{N_S, S, T_0, UID_{CS}, MAC(k_C)(N_S, S, T_0, UID_{CS}, URL_{VISIT})\}.$$

As noted above, this token is used to authenticate the identity cookie whenever the client tries to access the protected resource. By including timestamp $T_0$, the authentication token (or "authenticator") is time-dependent, although preferably the time period is quite short and is merely used to compensate for network latencies. By including the protected resource, $URL_{VISIT}$, the authentication token is bound to a request for that resource. The plug-in preferably calculates a new authentication token for every access the client requests (even to the same URL) and this token preferably is not placed in the client's cookie cache. In other words, the authentication token is not persistent; rather, it is a piece of information that is one-time use only.

The authentication token preferably uses the session key $k_{SC}$, which can be obtained as:

$$k_{SC} = h^{(3)}(k_C, S, IDC_{CS}),$$

where h(3) is another one-way function. The one-way hash functions h(1), h(2) and h(3) may be the same, or different. The key $k_{SC}$ binds the authentication token to the user identity inside the identity cookie and the request to access the protected resource. In other words, the authentication token is useful to authenticate that the request for the protected resource is bound to the identity contained within the identity cookie. Moreover, because the timestamp $T_0$ is unknown to the server, the information that is stored inside the authentication token is preferably:

$$N_S, S, T_0, UID_{CS}, MAC(k_{SC})(N_S, S, T_0, UID_{CS}, URL_{VISIT}).$$

The $URL_{VISIT}$ is included in the MAC so that the authentication token cannot be used to obtain access to a resource other than the one requested by the client. The server's identity, S, is included in the MAC so that the authentication token is also bound to the server S.

Returning to the flowchart, the routine continues at step 406. At this step, the browser sends to the server S the $URL_{VISIT}$, the identity cookie, and the authentication token as follows:

$$IDC_{CS} = [UID_C, S, URL_{CS}], (ACT_{CS})$$

$$ANC_C = N_S, S, T_0, UID_{CS}, MAC(k_{SC})(N_S, S, T_0, UID_{CS}, URL_{VISIT}).$$

Preferably, the authentication token is forwarded by the browser after it is placed in the HTTP header of the client request by the plug-in. Any other convenient technique for transferring the token between the client browser and the server may be used. As is well-known, all cookies in the browser cookie cache that are relevant to the server domain are forwarded with each HTTP request, so the identity cookie is automatically forwarded. Processing then continues at the server S.

In particular, the routine continues at step 408 with the server looking up the delta T in the client state data structure. The routine then checks at step 410 to see whether the times-tamp $T_0$ is within an allowable clock skew. As noted above, the clock skew may be set at a maximum by evaluating any expected network latencies. If the clock skew is not within an allowable limit, the access request is denied at step 412. If the timestamp $T_0$ is within the allowable clock skew, the routine continues at step 414 with the server determining the identity of the requester, $UID_{CS}$, from the identity cookie. At step 416, the server then calculates $k_{SC}$ in the same way as the client plug-in based on the value $UID_{CS}$ pulled from the identity cookie. At step 418, the server calculates the MAC and, at step 420, verifies whether it is equal to the MAC received in the authentication cookie. A keyed hashing technique, such as described in H. Krawczyk, HMAC: Keyed-Hashing for Message Authentication, RFC 2104, February, 1997, may be used for this purpose.

If the outcome of the test at step 420 indicates that the MACs are not the same, the routine branches to step 422 and returns an access denied message to the client to end the protocol run. If, however, the MAC generated is the same as the MAC in the authentication token, the routine continues at step 424 to store the authentication token and the timestamp $T_0$ in the client's state data structure. This prevents a reuse of the authentication cookie to ensure that the scheme is protected against a replay attack. This information is removed from the client's state information once the timestamp has expired.

Thus, upon receipt of the identity cookie and the request's associated authentication token, the server S determines the identity of the sender from the identity cookie and authenticates the request to access the protected resource against the authentication token. If the authentication token is not valid, the server S returns to the client an access denied message and the protocol terminates. If, however, the authentication token is valid, then the protocol continues as follows.

At step 426, the server uses the $ACT_{CS}$ (which is found in the client state data structure) to make an access control decision with respect to the URL to which the client desires access. The authentication token is stored at the server S for the "lifetime" of the token (which will be quite short, as described above) to enforce the one-time only use of this cookie. If the client is allowed to invoke the request URL, the invocation proceeds as normal at step 428. If the client is not allowed to invoke the requested URL, the server sends the client an access denied message at step 430 and the protocol ends.

Thus, according to the present invention, a one-time only authentication token is used to authenticate each request to access a protected resource. This token is unique to a given request and includes a time value that is used to protect against replay attacks. The authentication token is regenerated for each new request. It is protected by a key shared between the client and the server.

Figure 5:
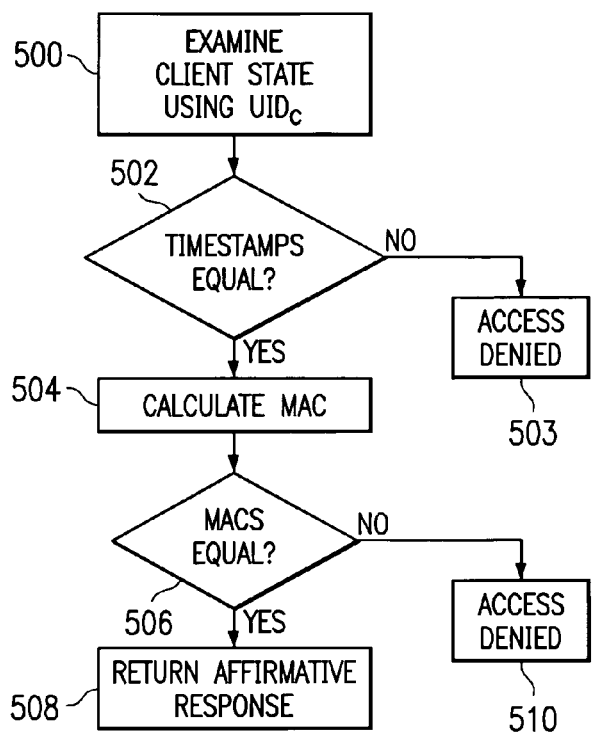
FIG. 5 is a flowchart of a modified protocol of the invention for use when the target server is different from the server that establishes the user's identity cookie.

When a target server B is different from the server that established the authentication (but is still within the same Internet domain), the target B has no knowledge about the client's key $k_C$ and no state information. Therefore, the target server is unable to validate the authentication token. The solution to this potential problem is provided by the $URL_{CS}$ that is contained inside the identity cookie. Preferably, this URL points to a script at the server S that has, as input, the client's $UID_{CS}$, the $URL_{VISIT}$ the client wants to access, and the authentication token. Execution of this script then returns an answer to the question regarding whether the authentication token is valid. FIG. 5 illustrates a flowchart of the process.

The routine begins at step 500 by examining the client's state using $UID_{CS}$. At step 502, the routine compares the received timestamp $T_0$ the timestamp contained in the client's state information to prevent a replay attack. If the timestamps do not match, an access denied message is issued at step 503. If the timestamps are the same, the routine continues at step 504 to calculate the MAC. At step 506, the routine compares the MAC to the MAC inside the authentication token. If the outcome of the test at step 506 indicates that the MACs do not match, an access denied message is generated at step 510. If, however, the MACs match, the script sends back a positive response at step 508 to complete the process. The target web server can then obtain the client's $ACT_{CS}$ as it is convinced about the client's identity (namely, $UID_{CS}$, which, for example, is the client's DCE principal name). Note that if the identity cookie contains the client's access control token, $ACT_{CS}$, and $ACT_{CS}$ has been suitably protected, the target web server does not need to obtain this information from another source. If the $ACT_{CS}$ is not included in the identity cookie then the target web server must call out to an authorization server to determine the value of $ACT_C$. Preferably, $URL_{CS}$ is secured within an ACL and is contacted over an SSL/TLS protocol connection, which prevents an outsider from intercepting or changing any information.

Figure 6:
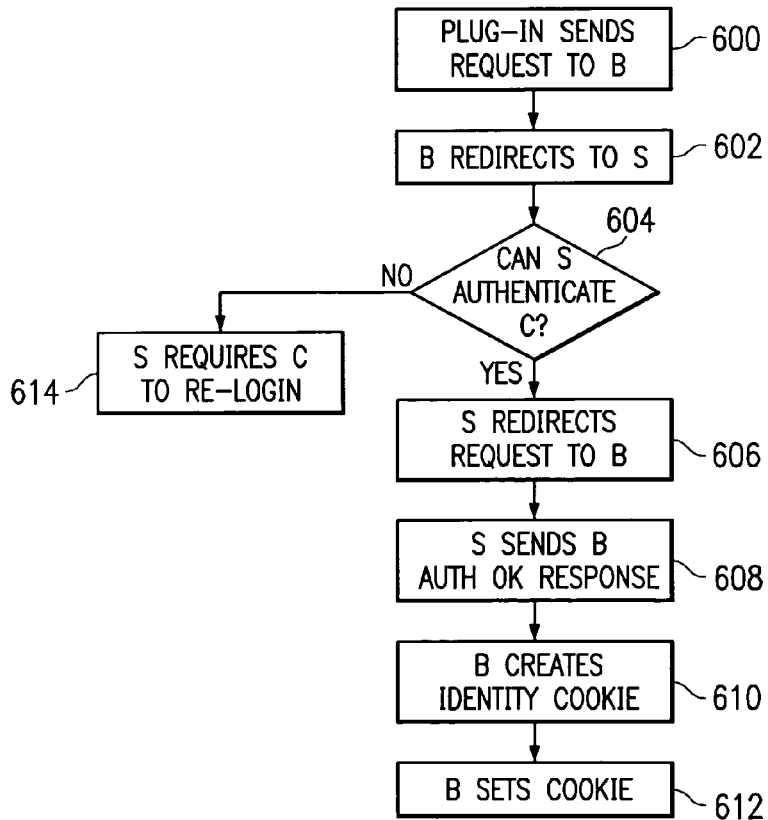
FIG. 6 is a flowchart illustrating another modified protocol according to the invention for handling out-of-domain resource requests.

The inventive protocol may also be implemented in a cross domain situation. In one embodiment, a target server B (in domain B) knows that S is the authentication server in domain S. This case occurs, for example, when the user wishes to access a protected resource that is outside of its DNS domain. The target server (B) also has no knowledge of the user. Because the target server is out-of-domain, there needs to be a way to communicate this information to the target server from the initial authentication server (S). This may be achieved as described in the flowchart of FIG. 6.

The routine begins at step 600 when the plug-in sends the request for the protected resource to the target server B. Because B is out-of-domain, the user's identity cookie is not forwarded to B. At step 602, the target server B redirects the request to the authentication server S. Because server B knows that server S is the authentication server, this information is established outside of the protocol. At this point, the user's identity cookie is forwarded to S by the user's browser. At step 604, the server S performs a test to authenticate the client based on the authenticator token as previously described. If the request is valid (authentic, not necessarily authorized), the routine continues at step 606. At this step, server S redirects the request to server B with the value $k_{BC}$ encrypted by a long-term shared key $K_{SB}$, where:

$$k_{BC} = h^{(s)}(k_{SC}, B)$$

$K_{SB}$ is a long, term shared, symmetric key between server B and server S. Preferably, this key is communicated between servers B and S through a back channel, e.g., a secure SSL/TLS communications channel. However this key is generated must be easily reproducible by the client without any intervention by server S. This allows the client to request protected resources at server B without intervention by server S.

At step 608, server S sends server B an "authentication okay" response that indicates to B that the request has been authenticated. At step 610, server B creates an identity cookie for C at B, called $IDC_{CB}$, that may or may not contain the user's access control token in the domain of B, such that $$IDC_{CB} = [UID_{CB}, B, URL_{CB}], (ACT_{CB})$$

At step 612, puts the identity cookie in C's browser. The shared C-B key and the identity cookie mean that future requests to server B need not invoke server S. Once the user has been "set up" at the out-of-domain server B in this fashion, it can generate "normal" requests as if server B were in-domain, where an authentic request to access a protected resource in the domain of B is defined as $$ANC_C = N_B, B, T_0, UID_{CB}, MAC(k_{BC})(N_B, B, T_0, UID_{CB}, URL_{VISIT}).$$

If the outcome of the test at step 604 indicates that the request is not authenticated, the routine branches to step 614. At this step, server S requires the client to re-login. Server S then redirects the required information to server B upon successful login. This completes the process.

The cross-domain protocol may be used if the client does not have an identity cookie at the target server B or if the client has already registered into domain B. In the former case, registration information must be transferred from the registering domain (server S) to the requested domain (server B). As described above, preferably this is accomplished using a secure, back channel. In the latter case, the protocol is the same as that illustrated in FIG. 4, where the server S has simply been replaced by the server B.

The present invention provides numerous advantages. The system offers a web-based single sign-on to end users desiring access to protected resources within and across authentication domains. The system enables the storage and maintenance of state information at the client side without having to install and configure specialized software (this is handled by the plug-in loaded by the signed applet). This state information preferably contains the ACT token which, in turn, enables use of a push model for an access control infrastructure. Further, as has been described, the protocol is not vulnerable to a replay attack. In particular, because the server keeps track of the previously used timestamp $T_0$, it is not possible (except within a small window) to replay an authentication token. The protocol is lightweight, as the cryptographic functions used are high performance.

Although not described in detail, the protocol may be run over the SSL protocol to provide additional services such as data confidentiality.

The inventive protocol is implemented in a client-side piece of code and a server-side piece of code, as has been described. More generally, the inventive functionality is implemented in software executable in a processor, namely, as a set of instructions (program code) in a code module resident in the random access memory of the computer. Until required by the computer, the set of instructions may be stored in another computer memory, for example, in a hard disk drive, or in a removable memory, or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Having thus described our invention, what we claim as new and desire to secure by Letters Patent is set forth in the following claims.

The invention claimed is:

1. A method for determining whether to allow access to a protected resource from a server, comprising the steps of:
at a client, responsive to a request to retrieve the protected resource, generating a one-time only use piece of data which can be used to authenticate that the request is bound to a given identity contained in a cookie previously set by an authentication server;

forwarding the piece of data to the server in the request;
at the server, determining whether the piece of data is valid; and
if the piece of data is valid, executing an access control decision to determine whether to invoke the request.

2. The method as described in claim 1 wherein the one-time only use piece of data is generated by applying a given function to a URL of the protected resource, a timestamp, a nonce generated by a server, the server's identity, and the client's identity.

3. The method as described in claim 2 wherein the given function is a message authentication code (MAC) calculated on the URL of the protected resource, the timestamp, the nonce, the server's identity, and the client's identity with a given key.

4. The method as described in claim 3 wherein the given key is a symmetric key $k_{SC}$ that binds the piece of data to the user identity contained in the identity cookie.

5. The method as described in claim 4 wherein the symmetric key is generated by applying a one-way hash function to a shared client-server key $k_C$, the server identity, and a nonce.

6. The method as described in claim 5 wherein the shared client-server key is generated by applying a one-way hash function to a user password.

7. The method as described in claim 1 wherein the cookie includes a userid, the server identity, and a URL pointing to a location at the server that includes a script.

8. The method as described in claim 1 wherein the cookie includes a userid, the server identity, and a URL pointing to a location at the server that includes a script, and an access control token.

9. The method as described in claim 8 wherein the script includes code for identifying whether a given piece of data is valid.

10. The method as described in claim 9 wherein the script is accessed if the protected resource is located on a server other than the authentication server and the server and the authentication server are located within the same authentication domain.

11. A method of accessing a protected resource at a server, comprising the steps of:
at the server, receiving a request for a URL together with an identity cookie and a one-time only use authentication token associated with the request;
determining whether the authentication token is valid;
if the authentication token is not valid, returning to a requesting client an access denied message; and
if the authentication token is valid, executing an access decision function to determine whether to allow access to the protected resource.

12. The method as described in claim 11 wherein the authentication token comprises a message authentication code (MAC) calculated on a URL of the protected resource, a nonce generated by the server, the server's identity, a user's identity, and a timestamp with a given key.

13. The method as described in claim 12 wherein the given key is a symmetric key $k_{SC}$ that binds the piece of data to the user identity as defined in the identity cookie.

14. The method as described in claim 11 wherein the identity cookie includes a userid, an optional access control token, and a URL pointing to a location that includes a script.

15. The method as described in claim 12 wherein the step of determining whether the authentication token is valid includes the steps of:
calculating a message authentication code;
evaluating whether the message authentication code is the same as the MAC in the authentication token.

16. The method as described in claim 12 further including the step of saving the timestamp in a data structure to prevent replay of the authentication token.

17. The method as described in claim 16 further including the step of saving a nonce generated by the server, the server's identity, and the user's identity to prevent replay of the authentication token by a client other than the user.

18. A computer program product in a computer-useable medium executable by a processor in a client computer, comprising:
code, responsive to a request to a server for retrieval of a protected resource, which generates a unforgeable piece of data which can be used at the server to authenticate that the request is bound to a given identity contained in a cookie previously set by an authentication server; and
code for inserting the piece of data into the request to the server.

19. The computer program product as described in claim 18 further including a signed applet for installing the code in the client computer.

20. The computer program product as described in claim 18 wherein the code which generates the unforgeable piece of data comprises:
code for calculating a message authentication code (MAC) on a URL of the protected resource, a nonce generated by a server, the server's identity, a user's identity and a timestamp with a given key.

21. The computer program product as described in claim 20 wherein the code for calculating the message authentication code further includes code for generating the given key.

22. The computer program product as described in claim 21 wherein the given key is a symmetric key that binds the piece of data to the user's identity contained in the cookie.

23. A computer program product for use in a computer-useable medium executable by a processor in a server, comprising:
code responsive to receipt of a request for a URL for a protected resource together with a one-time only use authentication token associated with the request for determining whether the authentication token is valid;
code for returning to a requesting client an access denied message if the authentication token is not valid; and
code for controlling execution of an access decision function if the authentication token is valid.

24. The computer program product as described in claim 23 wherein the authentication token comprises a message authentication code (MAC) calculated on the URL of the protected resource, a nonce generated by a server, the server's identity, a user's identity, and a timestamp with a given key.

25. The computer program product as described in claim 24 wherein the given key is a symmetric key $k_{SC}$ that binds the piece of data to the user identity contained in an identity cookie set by an authentication server.

26. The computer program product as described in claim 25 wherein the code for determining whether the authentication token is valid includes:
code for calculating a message authentication code; and
code for evaluating whether the message authentication code is the same as the MAC in the authentication token.

27. The computer program product as described in claim 23 further including code for saving the timestamp and the authentication token in a data structure to prevent replay of the authentication token.

28. A method for issuing an access request from a client browser to a server hosting a protected resource, wherein an identity cookie has been set on the client browser by an authentication server, comprising:

using a symmetric key to derive a message authentication code (MAC) on a URL of the protected resource and a timestamp;

inserting the MAC together with the timestamp, the nonce set by the server, the server's identity, and a user's identity into a header of the request; and forwarding the request to the server together with the identity cookie to enable the server to determine whether a requestor is authorized to access the protected resource.

29. The method as described in claim 28 wherein a MAC is generated upon each request for the protected resource.

30. The method as described in claim 28 wherein the symmetric key binds the MAC to a user identity contained in the identity cookie.

31. The method as described in claim 30 wherein the symmetric key is generated by applying a one-way hash function to a shared client-server key $K_C$, a nonce and the identity of the server that generated the nonce.

32. The method as described in claim 31 wherein the shared client-server key is generated by applying a one-way hash function to a user password.

33. The method as described in claim 28 wherein the identity cookie includes a userid, and a URL pointing to a location that includes a script.

34. The method as described in claim 28 wherein the identity cookie includes a userid, a URL pointing to a location that includes a script, and an access control token.

35. The method as described in claim 34 wherein the script includes code for identifying whether a MAC is valid.

* * * * *